United States Patent [19]
Clark et al.

[11] Patent Number: 5,429,387
[45] Date of Patent: Jul. 4, 1995

[54] LOW PRESSURE SWITCH/INITIATOR/GAS GENERATOR

[75] Inventors: Marcus T. Clark, Kaysville; Brent R. Marchant, Ogden, both of Utah

[73] Assignee: Morton International, Inc., Chicago, Ill.

[21] Appl. No.: 197,627

[22] Filed: Feb. 16, 1994

[51] Int. Cl.⁶ .................. B60R 21/26; H01H 35/34
[52] U.S. Cl. ..................... 280/737; 280/741; 102/202.7; 200/83 A; 200/83 N; 200/83 Y; 73/717; 73/719
[58] Field of Search ............ 280/737, 741, 736, 740, 280/735; 102/202.7, 202.5, 530, 531; 200/83 R, 83 A, 83 N, 83 P, 83 Y; 73/716, 717, 719, 723, 725

[56] References Cited

U.S. PATENT DOCUMENTS

| | | | |
|---|---|---|---|
| 3,850,039 | 11/1974 | Brakebill | 280/741 |
| 3,869,143 | 3/1975 | Merrell | 200/83 N |
| 5,225,643 | 7/1993 | Marchant | 200/83 Y |
| 5,290,060 | 3/1994 | Smith | 280/737 |

Primary Examiner—Margaret A. Focarino
Assistant Examiner—Peter C. English
Attorney, Agent, or Firm—Gerald K. White

[57] ABSTRACT

A single device acts as a pressure switch, gas generated heater, and an igniter. The device has pyrotechnic material such as a combustible gas in an inner chamber. An outer chamber, that is, a chamber in which the device is positioned, includes a gas that may or may not be combustible. A monitor current flows through a pressure monitor resistor and a bridgewire resistor monitoring continuity. When the pressure in the outer chamber decreases below a threshold value, the pressure monitor resistor breaks continuity and causes a resistance change. If an air bag is to deploy, the bridgewire resistor heats up to a point that the pyrotechnic material in the inner chamber is ignited. The resulting combustion ruptures pressure discs and the outward hot product heats the gas in the outer chamber. The outer chamber ruptures and the heated gas therein flows in the air bag.

17 Claims, 3 Drawing Sheets

LOW PRESSURE SWITCH/INITIATOR/GAS GENERATOR

BACKGROUND OF THE INVENTION

1. Field of the Invention

This invention relates to combining the functions of an initiator, gas generator/heater and a "low pressure switch" (LPS) into a single device for convenience, termed herein an "initiator/monitor" device and having especial utility in the inflator of a vehicular stored gas inflatable air bag safety restraint system. A stored gas system includes a gas generator for the generation of gas and a vessel in which compressed or pressurized gas is stored to supply additional gas under pressure to inflate an inflatable air bag to protect the occupants of a vehicle upon the impact thereof with a harm producing object.

2. Description of the Prior Art

An inflatable air bag has a folded condition for storage in a steering wheel, dashboard or other appropriate location within a vehicle in close proximity to normal occupant position. Upon the occurrence of a collision of the vehicle, expansion of the inflatable bag may be effected or augmented by an inflator comprising a fluid supply in the form of a pressure vessel defining a chamber which contains a stored compressed or pressurized supply of gas.

In U.S. application for patent bearing Ser. No. 989,854 filed on Dec. 14, 1992 by Bradley W. Smith entitled "HYBRID GAS GENERATOR FOR AIR BAG INFLATABLE RESTRAINT SYSTEMS" now U.S. Pat. No. 5,290,060 and assigned to the assignee of the present invention, a pressurized stored gas supply in a pressure vessel is released upon the actuation of a gas generator, more particularly, a pyrotechnic heater, which heats and increases the pressure of the stored gas. This causes the rupture of a portion of the pressure vessel which communicates with suitable gas flow directing means leading to and allowing the gas to escape into the interior of an inflatable bag. The bag inflates in front of the occupant and acts as a protective cushion.

The compressed or pressurized supply of gas is a very important part of a hybrid safety restraint system. If the gas pressure falls below a predetermined level, the system will not operate properly.

The pressurized vessel typically is compressed or pressurized with an inert gas such as argon, or a mixture of argon and another inert gas, to approximately 3000 psi at room temperature. Such vessels must be adapted to maintain the stored gas pressure so that the pressure does not drop by more than about 200 psi when at room temperature during the life of the vehicle which may be fifteen (15) years or more. These limits are illustrative only and are not intended in any manner to place restrictions on the scope of the claimed invention.

In a compressed or pressurized gas air bag inflation system, a means of predictably and substantially instantaneously releasing the pressurized gas from the inflator to fill the air bag is required. In addition, it may be desirable to heat the gas at the time of release to increase the pressure and/or improve the air bag inflation characteristics. Most domestic car manufacturers currently also require a temperature compensated means of detecting if a substantial amount of the compressed or pressurized gas has leaked from the inflator during the lifetime of the inflator.

Current hybrid air bag inflators use a "low pressure switch" to indicate the adequacy of the volume of gas stored in the inflator, an initiator (squib), a gas generator, and additional pyrotechnic material to heat the "cold" gas stored in the pressure vessel. There is a need and a demand for the replacement of the above components with one, cost effective, small device to reduce the complexity and cost of the inflator assembly. The present invention was devised to fill the gap that has existed in the art in this respect.

SUMMARY OF THE INVENTION

An object of the invention is to combine the functions of an initiator, gas generator/heater, and a low pressure switch into a single device.

Another object of the invention is to provide in a single device a combination LPS/initiator/gas generator for a compressed gas air bag inflator.

Still another object of the invention is to provide in a single device the initiation train and pressure differential switch of the inflator of a hybrid inflatable air bag safety restraint system to reduce, for example, the cost, size and weight, with the pressure monitoring function being added to the initiating train at little cost.

A further object of the invention is to provide such a device that is characterized by the incorporation therein of a temperature compensating means for detecting whether any compressed or pressurized gas has leaked from the inflator during the lifetime of the inflator.

In accomplishing these and other objectives of the invention the device utilizes the basic structure of the "DIFFERENTIAL PRESSURE SWITCH FOR STORED GAS PRESSURE VESSEL" disclosed in U.S. Pat. No. 5,225,643 granted on Jul. 6, 1993 to Brent R. Marchant and assigned to the assignee of the present invention. The device detects the adequacy of pressure in the pressure vessel and acts as an ignition train initiator by the incorporation of an oxidizer (solid or gas) and a fuel (solid or gas) within the device. For example, the device may have a combustible gas in an inner chamber, the pressure temperature curve of which combustible gas matches that of the compressed gas in an outer chamber. The outer chamber, for example the chamber of a pressure vessel of a hybrid air bag inflator in which the device is positioned, may contain a combustible or inert gas, depending upon the energy release needed. Monitor electric current for the air bag restraint system flows through a pressure monitoring resistor and a bridgewire ignition initiating resistor within the device, monitoring continuity. When and if the pressure in the outer chamber decreases below a preset threshold value, the pressure monitoring circuit breaks continuity. Thus, a resistance change occurs in a circuit in which the pressure monitoring and bridgewire resistors are connected, which circuit is connected to a diagnostic unit. The switch acts as a low pressure switch when the pressure inside the switch is set such that it forces two diaphragms together, completing an electrical circuit including the pressure monitoring resistor when there is sufficient pressure in the hybrid inflator for proper air bag inflation. A pressure drop in the inflator causes the diaphragms to be forced apart opening the electrical circuit through the pressure monitoring resistor.

The bridgewire resistor inside the LPS body preferably has a resistance value higher than or comparable to that of the pressure monitoring resistor and never loses continuity until it has performed as expected or operated properly, that is, functioned. The two circuits connecting the bridgewire resistor and the pressure monitoring resistor are connected in parallel and the continuity of both of the resistor circuits is continuously measured externally by a suitable diagnostic unit by running a small or low current through the two LPS pins and measuring the overall resistance. For example, if the pressure monitoring resistor is 100 ohms and the bridgewire resistor is 50 ohms, the external diagnostic circuitry would measure 1/(1/100+1/50)=33 ohms. If the pressure monitoring resistor lost continuity due to pressure loss in the inflator, the resistance measured by the diagnostic unit would change to 50 ohms (the resistance of the bridgewire circuit alone) and the diagnostic unit would detect that the low pressure switch had lost continuity. If the bridgewire resistor somehow became disconnected, the resistance would change to 100 ohms (the resistance of the pressure monitoring resistor alone) and the diagnostic unit would detect this also. Under normal operating conditions, both circuits would be closed and 33 ohms would be measured at all times. In the event of a vehicular collision, the diagnostic unit would apply a large current through the LPS pins, causing the bridgewire resistor to heat to a predetermined level to ignite the solid material or explosive gas(ses) in the initiator/monitoring device. If needed, the pressure monitoring resistor could have a fuse incorporated therewith to break continuity immediately upon application of the large current so as not to interfere with the operation of the bridgewire resistor ignition. When ignited, the gas inside the LPS body expands and ruptures at least one pressure disc in the wall of the LPS body, allowing the hot gas to mix with the stored gas(ses) in the inflator and to ignite or expand it/them. This, in turn, builds up enough pressure to cause a diaphragm restraining the stored inflator gas to rupture, allowing that gas to escape into the air bag and to inflate it.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawings which form part of the specification, in which like parts are designated by the same reference numbers, and of which.

DESCRIPTION OF THE PREFERRED EMBODIMENT

Figure 1:
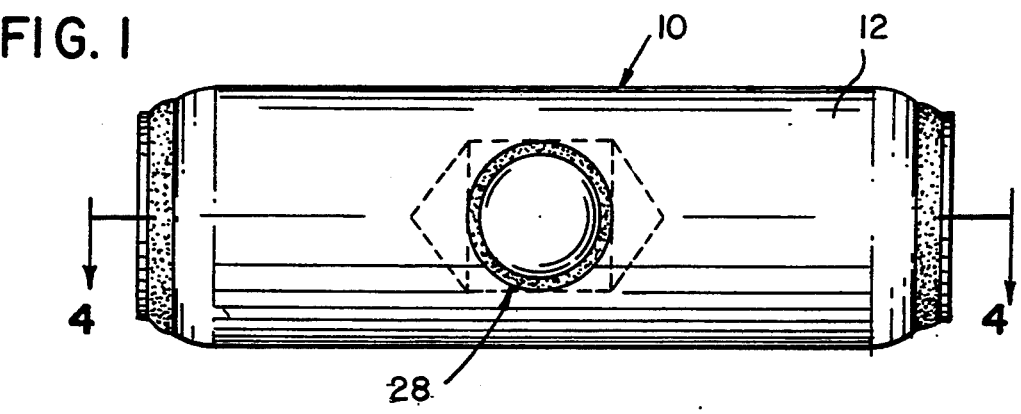
FIGS. 1, 2 and 3 are front, side and end views, respectively, illustrating a hybrid inflator.
Figure 2:
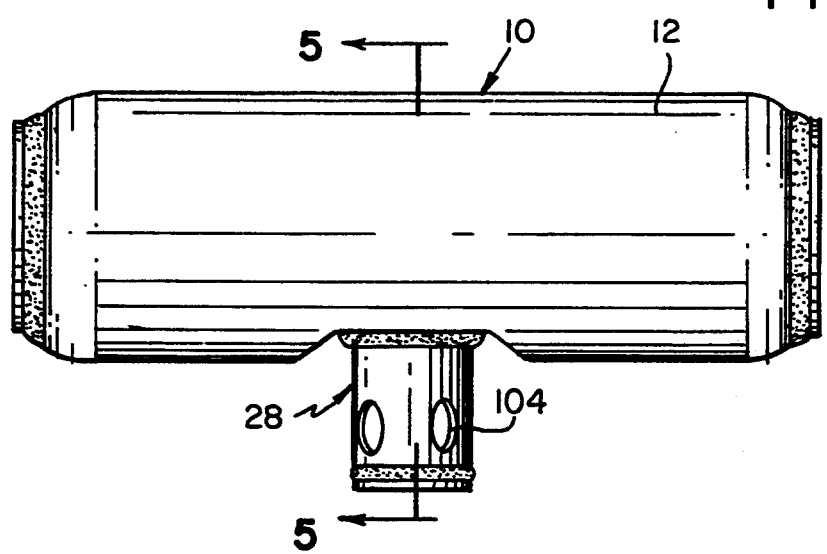
Figure 3:
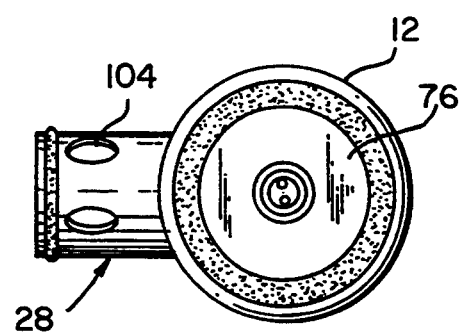

Referring to the drawings, there is shown a hybrid inflator assembly 10 for inflating a vehicle occupant restraint such as an air bag (not shown). The inflator assembly 10 comprises a pressure vessel 12 including a storage chamber 14 that is filled and pressurized with an inert gas such as argon or nitrogen to a pressure typically in the range of 2000–4000 psi.

The chamber 14 is defined by an elongated cylindrical sleeve 16. A fill plug 18 is attached by a circumferential weld 20 in sealing relation to a first end 22 of sleeve 16. An initiator/monitor device 24 according to the invention is recessed in sealing relation into chamber 14 from a second end 26 of sleeve 16. A diffuser 28 extends at substantially a 90° angle from the exterior surface 30 of sleeve 16 at a location intermediate the ends 22 and 26 thereof. Diffuser 28 is arranged in sealing relation with sleeve 16 and provides a passage for the flow of gas from pressure chamber 14 through one or more normally closed constricting orifices 32 that are provided in the wall of sleeve 16.

The initiator/monitor device 24 includes a chamber 34 which is pressurized to a predetermined reference or control level. The chamber 34, which is hermetically sealed, is defined by two mirror symmetrical electrically conductive flexible diaphragms 36 and 38. Each of the diaphragms 36 and 38 may have a raised surface 40 and 42, respectively, as shown, in the central region thereof. Adapted for electrical connection between the raised surfaces 40 and 42 is a resistor 44 which may have a value of 100 ohms and serves an LPS monitoring function. Resistor 44 is adapted to make and break contact with the diaphragm raised surfaces 40 and/or 42 as the diaphragms 36 and 38 move toward and away from each other from a predetermined spaced relation.

Figure 7:
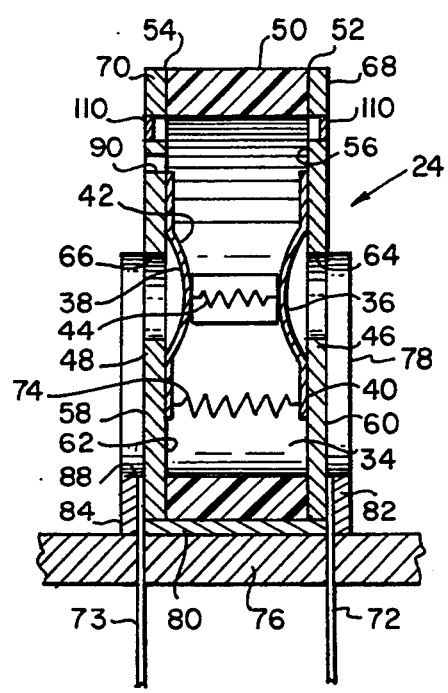
FIG. 7 is a cross-sectional view of the initiator/monitor device taken along the lines 7—7 of FIG. 6.

When the pressure inside the chamber 34 defined by the diaphragms 36 and 38 as illustrated in FIG. 7 is set such that it forces the diaphragms 36 and 38 toward each other completing a circuit through the resistor 44, there is sufficient pressure of stored gas in the vessel 12 for proper inflatable bag inflation. A pressure drop of the stored gas in the vessel 12 forces the diaphragms 36 and 38 apart, opening the circuit through the resistor 44.

The diaphragms 36 and 38 which, typically, may be made out of stainless steel or other suitable material including inconel and carbon steel, are physically positioned in parallel relation to each other. Each of the diaphragms 36 and 38, termed first and second diaphragms, respectively hereinafter, is attached in a symmetrical manner, as by brazing, in sealing relation to a respectively associated electrically conductive protective ring or washer 46 and 48. The protective rings 46 and 48, in turn, are mounted in spaced relation to each other on the opposite sides of an electrically non-conductive spacer ring or washer 50, being hermetically sealed thereto by suitable sealing means indicated at 52 and 54, respectively. Alternatively, the diaphragms 36 and 38 may be attached directly to the electrically non-conductive spacer ring 50 and backed up with the protective rings 46 and 48 or another suitable backing method.

More specifically, each of the protective rings 46 and 48 has a first side 56 and 58, respectively, and a second side 60 and 62, respectively. The first diaphragm 36 is attached in sealing relationship to the first side 56 of the first protective ring 46, symmetrically with respect to an aperture 64 in the ring 46. The second diaphragm 38 is attached in sealing relationship to the second side 62 of the second protective ring 48, symmetrically with respect to an aperture 66 in the ring 48. The first side 56 of the first protective ring 46 is disposed in sealing relationship with a first side 68 of the spacer ring 50. The second side 62 of the second protective ring 48 is disposed in sealing relationship with the second side 70 of the spacer ring 50.

The arrangement is such that the diaphragms 36 and 38 are positioned so that the surfaces 40 and 42, which may or may not be raised, are directly opposed. Apertures or openings 64 and 66 in the protective rings 46 and 48, respectively, allow external pressure, that is, the pressure outside of the chamber 34, specifically the pressure of the pressurized or compressed gas that is stored in the pressure vessel 12, to act on the diaphragms 36 and 38.

Electrical leads from the protective rings 46 and 48 are attached to pins or lead wires 72 and 73, respectively, through a header 76. To that end, each of the pins 72 and 73 may be welded to a respectively associated one of the protective rings 46 and 48.

Positioned in the chamber 34 adjacent the connection of the pins 72 and 73 to the protective rings 46 and 48, respectively, and extending between the protective rings 46 and 48, to each of which is permanently connected, is a bridgewire initiator resistor 74. The value of resistor 74 may be 50 ohms.

A suitable housing 78 may be provided to protect the initiator/monitor device 24. The housing 78 includes a base 80 and parallel vertical walls 82 and 84 that are spaced to receive the assembled diaphragms 36 and 38, the protective rings 46 and 48 and the spacing ring 50 in a snug fit. Cutouts 86 and 88 in the housing 78 expose a substantial portion of each of the protective rings 46 and 48 including the apertures 64 and 66 therein, respectively.

Figure 4:
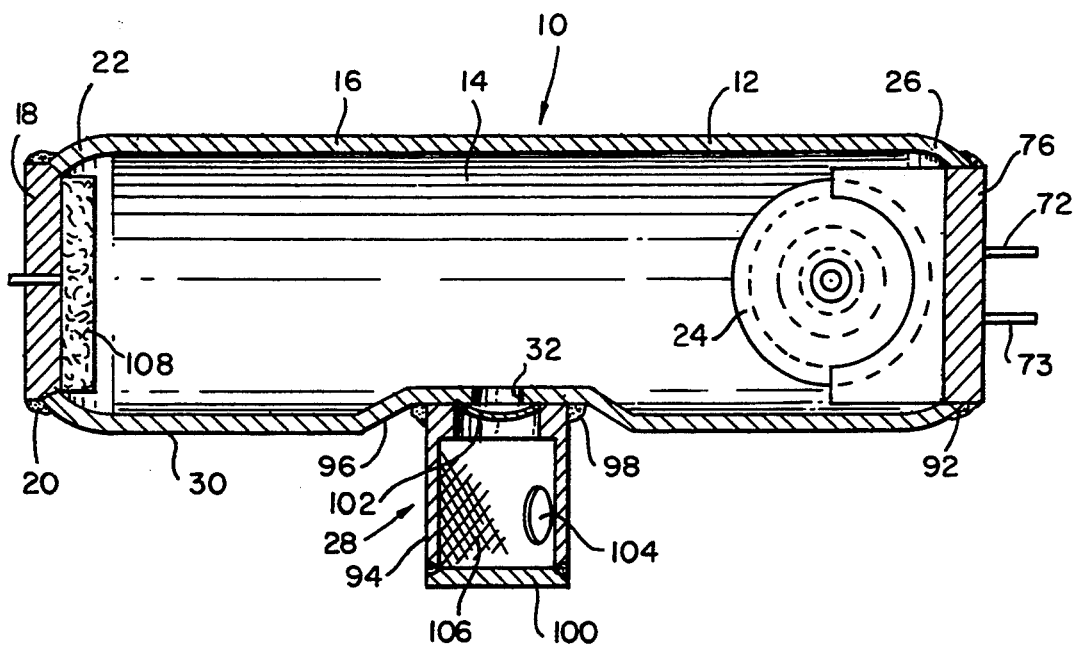
FIG. 4 is a cross-sectional view of the hybrid inflator taken along the lines 4—4 of FIG. 1.
Figure 5:
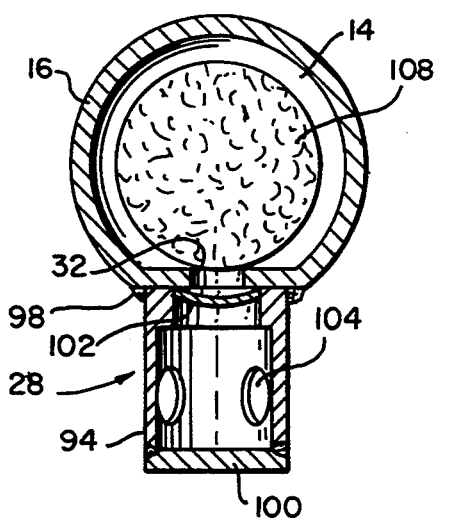
FIG. 5 is a cross-sectional view taken along the lines 5—5 of FIG. 2.
Figure 8:
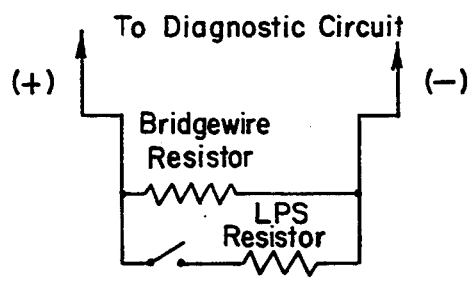
FIG. 8 is a circuit diagram illustrating the connection to a diagnostic unit of a bridgewire resistor and an LPS resistor provided in the initiator/monitor device.

The header 76, as best seen in FIG. 4, mates with the second end 26 of the cylindrical sleeve 16 of the pressure vessel 12. The sleeve 16 and the adjacent outer region of the header 76 are joined in sealing relation by a circumferential weld 92.

Pressurization of the chamber 34 of the initiator/monitor 24 may be effected in a pressurized atmosphere of a combination of combustible gases whose pressure/temperature curve substantially matches that of the compressed gas in the storage chamber 14 during assembly of the diaphragms 36 and 38 to protective rings 46 and 48, respectively associated therewith, and to the spacer ring 50. No fill ports are required when the chamber 34 is pressurized during the assembly process. Optionally, pressurization may be effected through a fill port 90 provided in protective ring 48. Upon charging or pressurizing the chamber 34 to the desired pressure level through the fill port 90, the latter may be closed off in any suitable manner. Pressurizing the chamber 34 does not involve penetration of the wall of the diaphragms 36 and 38. This is for the reason that the diameter of the protective rings 46 and 48, as shown, is sufficiently greater than that of the diaphragms 36 and 38 to allow access to the chamber 34 from the outside through the protective rings 46 and 48 alone. Alternatively, the chamber could be pressurized through a hole in the diaphragm and closed off using any suitable method.

When the diaphragms 36 and 38 are pressurized internally, as herein disclosed, with low pressure on the outside, that is, externally of the chamber 34, the diaphragms 36 and 38 are forced apart by the internal pressure in chamber 34. When the diaphragms 36 and 38 are pressurized externally, the diaphragms are caused to move closer together.

In accordance with the invention, the reference or control pressure level to which the chamber 34 is selected to be pressurized typically is lower by about 200-300 psi than that of the stored gas in the pressure vessel 12 which is to be monitored by the initiator/monitor device 24.

Diffuser 28 comprises a generally cylindrical sleeve 94 that is joined at one end to the sleeve 16, at a depressed portion 96 of the surface 30 thereof in which the orifice 32 is provided, by a circumferential weld 98. The other end of sleeve 94 is joined to and sealed by a gas impervious closure plate 100. A thin metal diaphragm 102, referred to hereinafter as a third diaphragm, provides a seal for orifice 32 in the wall of sleeve 16 which defines storage chamber 14. Provided in sleeve 94 of diffuser 28 are a plurality of orifices 104 for dispensing inflating gas uniformly from chamber 14 into an air bag assembly (not shown).

A course screen or perforated metal sheet indicated at 106 is provided in the diffuser 28 to cover the diffuser orifices 104 to prevent fragments of the diaphragms from entering the air bag assembly. If filtering is desired, the coarse screen 106 could be replaced with a filter assembly of wraps of metal and/or ceramic fiber materials which are common in the art.

Further filtering may be achieved by placing impingement filter material indicated at 108 on the inside surface of the fill port and plug 18 opposite the initiator/monitor 24. Filter 108 would be made with woven or matted metal and/or ceramic fibers which functions by providing a large surface area upon which liquid phased particulates entrained in the impinging gases may condense.

In the operation of the hybrid gas generator, upon the receipt of an electric signal indicative of the onset of a crash and a need for inflation of an air bag (not shown) a diagnostic unit (not shown) supplies a large current through the pins 72 and 73, causing the bridgewire resistor 74 to ignite the gas in the chamber 34 of the initiator/monitor device 24. When ignited the gas in chamber 34 explodes and ruptures pressure discs 110 in the wall members 46 and 48 of the initiator/monitor device 24, allowing the hot gas to mix with the stored gas in chamber 14 of the pressure vessel 12. This heats the stored gas in vessel 12 causing a rapid pressure rise in the chamber 14.

When the pressure of the stored gas exceeds the structural capability of the thin metal diaphragm 102 in the diffuser 28, the diaphragm 102 ruptures allowing the heated stored gas to vent through the orifice 32 and the diffuser orifices 104 into the inflatable bag assembly. Between the diffuser diaphragm 102 and the storage chamber 14 are one or more constricting orifices 32 which throttle the flow of gas from the storage chamber 14, providing the proper fill rate to the air bag. The coarse screen or perforated metal sheet 106 prevents fragments of the initiator/monitor 24 and diaphragm 102 from entering the air bag assembly. Impingement filter 108 on the fill port and plug 18 provides further filtering by condensing thereon liquid phase particles entrained in the impinging gases.

In a first embodiment of the invention, the initiator/monitor device 24 acts as an ignition train monitor by the incorporation of an oxidizer gas and a fuel gas, for example, methane, within the internal chamber 34 and with an inert stored gas such as argon or nitrogen contained in the outer chamber 14 within the pressure vessel 12.

In a second embodiment of the invention, it is contemplated that the outer chamber 14 may contain a combustible gas depending upon the energy release needed.

Figure 9:
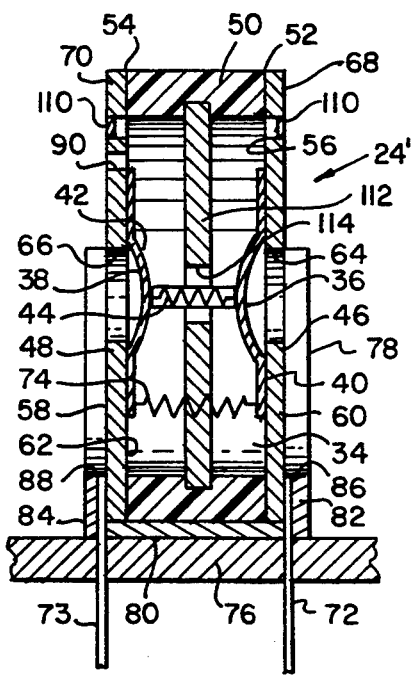
FIGS. 9 and 10 are fragmented disclosures of modified initiator/monitor devices according to the invention.

In a third embodiment of the invention, as illustrated in FIG. 9, the oxidizer in the internal chamber 34 of the device 24 is in the form of a solid disc.

Figure 10:
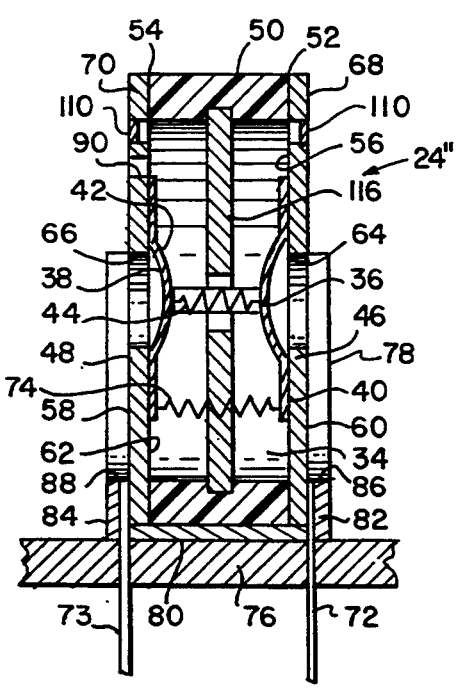

In a fourth embodiment of the invention, as illustrated in FIG. 10, the pyrotechnic fuel in the internal chamber 34 of the device 24 is in the form of a solid disc.

Figure 6:
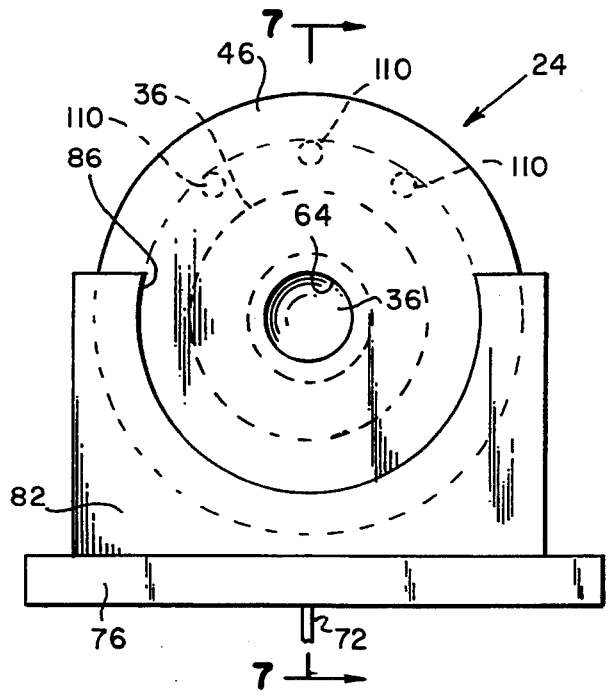
FIG. 6 is a front view of the initiator/monitor device of FIG. 4.

As shown in FIG. 9, the initiator/monitor device 24' differs from the device 24 shown in FIGS. 6 and 7 by the inclusion of a perforated oxidizer disc 112 that is supported between the diaphragms 36 and 38 internally of a non-conductive spacer ring 50' in the inner chamber 34 with the LPS resistor 44 extending through an aperture 114 in the disc 112. The oxidizer disc 112 provides an oxidizer selected from the group consisting of solid, liquid and gas. The device 24' has combustible gas in the inner chamber 34. The outer chamber 14 has a gas which may or may not be combustible. The monitor current flows through the pressure monitoring resistor 44 and the bridgewire resistor 74, monitoring continuity. When and if the pressure in the outer chamber 14 decreases below a threshold value, the resistor 44 breaks continuity and there is a resistance change. If the air bag is to deploy, the bridgewire resistor 74 heats up to a point that the combustible gas and the oxidizer disc 112 combust. This ruptures the pressure discs 110 and heats the gas in the outer chamber 14. The outer chamber ruptures and gas flows through diffuser 28 into the air bag (not shown).

The initiator/monitor device 24" shown in FIG. 10 differs from the device 24 shown in FIG. 6 by the inclusion in the inner chamber 34 of a perforated fuel disc 116. The fuel disc 116 provides a fuel selected from the group consisting of solid, liquid and gas. The disc 116 is supported between the diaphragms 36 and 38 internally of the non-conductive spacer ring 50' with the LPS resistor 44 extending through an aperture 118 in the disc 116. Thus, the switch/initiator or igniter/generator 24" need not use a combustible gas. For the function of the switch, it is preferred to use the same gas in the inner chamber 34, that is, internally of the device 24"', as is used in the external chamber 14 in order that the detection of whether any of the pressurized gas in the inflator has leaked therefrom may be temperature compensated.

Thus, in accordance with the invention, there has been provided in a single size, weight and cost effective device a combination LPS/initiator/gas generator for a compressed gas air bag inflator, with the pressure monitoring function being added to the initiation train at little cost. Incorporating the initiator and gas generator functions into the differential pressure low pressure switch reduces the cost and complexity of the inflator assembly.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A combination low pressure switch/initiator/gas generator device for a compressed gas air bag inflator comprising, first and second diaphragms each of which are electrically conducting, electrically non-conductive spacer means having a first side and a second side, attaching means attaching said first diaphragm and said second diaphragm in opposed and sealing relation to said first and second sides, respectively, of said spacer means thereby forming a hermetically sealed chamber, with said first diaphragm and said second diaphragm being movable toward and away from each other from a predetermined spaced relationship as the pressure of the environment externally of said hermetically sealed chamber increases and decreases relatively to the pressure in said hermetically sealed chamber, pyrotechnic means contained in said hermetically sealed chamber, said pyrotechnic means igniting when heated to a predetermined level, a bridgewire resistor having a first end and a second end, said bridgewire resistor being located in said hermetically sealed chamber and having said first end electrically connected to said first diaphragm and said second end electrically connected to said second diaphragm, a pressure monitoring resistor having first and second ends positioned so as to make and break electrical contact with said first and second diaphragms as said first and second diaphragms are moved toward and away from each other from a predetermined spaced relation, electrical circuit means in which said bridgewire resistor and said pressure monitoring resistor are connected in parallel relation when both said first and second ends of said pressure monitoring resistor are in electrical contact with said diaphragms, said electrical circuit means normally having a flow of electrical monitoring current therein which is too low to cause sufficient heating of said bridgewire resistor to ignite said pyrotechnic means in said hermetically sealed chamber, but having a capability of having produced therein a flow of electrical current at a level high enough to cause such heating of said bridgewire resistor, whereby, with said hermetically sealed chamber pressurized to a predetermined reference level, in atmospheric environment conditions the pressure in said chamber is higher than atmospheric pressure and said first and second diaphragms are caused to move away from each other and thereby break the electrical contact of said pressure monitoring resistor with said second diaphragm and cause a change of resistance in said electrical circuit means, whereby with the pressure of the environment external to said hermetically sealed chamber higher by a predetermined amount than said predetermined reference level in said chamber, said first and second diaphragms are caused to move toward each other and cause the ends of said pressure monitoring resistor to make electrical contact with said diaphragms and cause a change in the resistance of said electrical circuit means, whereby, if the seal of said hermetically sealed chamber fails, the resulting equalization of the chamber pressure and the pressure of the environment external to said chamber causes said first diaphragm and said second diaphragm to move away from each other and break the electrical contact between one end of said pressure monitoring resistor and said respective diaphragm and cause a change in the resistance of said circuit means, and whereby with a flow of a large electrical current through said bridgewire resistor, that is, an electrical current at a level high enough to cause heating thereof, said bridgewire resistor heats up to a point that causes ignition of said pyrotechnic means in said hermetically sealed chamber.

2. A device as defined by claim 1 wherein said first and said second diaphragms are mirror symmetrical.

3. A device as defined by claim 1
wherein said pyrotechnic means in said hermetically sealed chamber comprises an oxidizer selected from the group consisting of solid, liquid and gas and a fuel selected from the group consisting of solid, liquid and gas.

4. A device as defined by claim 1
wherein said pyrotechnic means in said hermetically sealed chamber comprises a gaseous oxidizer and a combustible gas.

5. A device as defined by claim 4
wherein said combustible gas in said hermetically sealed chamber is methane.

6. A device as defined by claim 1
wherein said pyrotechnic means in said hermetically sealed chamber comprises a gaseous oxidizer and a solid fuel disc.

7. A device as defined by claim 1
wherein said pyrotechnic means in said hermetically sealed chamber comprises a solid oxidizer and a combustible gas.

8. A device as defined by claim 7
wherein said combustible gas in said hermetically sealed chamber is methane.

9. A device as defined by claim 1
wherein said spacer means comprises a spacer ring, and
wherein said attaching means includes first and second protective rings each of which has an aperture therein in a central portion thereof and has a first side and a second side, said first diaphragm being attached in sealing relationship to said first side of said first protective ring symmetrically with respect to the aperture therein, said second diaphragm being attached in sealing relationship to said second side of said second protective ring symmetrically with respect to the aperture therein, with the first side of said first protective ring being disposed in sealing relationship with the first side of said spacer ring and the second side of said second protective ring being disposed in sealing relationship with the second side of said spacer ring.

10. A device as defined by claim 9,
wherein said first and said second diaphragms are attached to said first and second protective rings by mechanical bonding.

11. A device as defined by claim 9,
wherein said first and said second protective rings are each electrically conductive.

12. A device as defined by claim 11 further including a separate electrical lead attached to each of said first and second protective rings.

13. A device as defined by claim 9 further including a housing therefore, said housing including a base and parallel walls between which said device over a portion, at least, thereof is positioned in a snug fit, with each of said walls having a circular cutout therein to expose a substantial portion of the adjacent protective ring including the aperture therein.

14. A device as defined by claim 9,
further including a pressure disc provided in at least one of said protective rings to rupture and allow the heated gases to flow out of said hermetically sealed chamber upon ignition of said pyrotechnic means therein.

15. A device as defined by claim 1,
wherein said pyrotechnic means in said hermetically sealed chamber comprises a combination of combustible gases whose pressure/temperature curve substantially matches that of the environment external to said hermetically sealed chamber to provide temperature compensation in pressure sensing of the external environment.

16. A device as defined by claim 1,
further including a fuse connected in series with said pressure monitoring resistor to break the continuity thereof immediately upon the application of a large electrical current by said circuit means so as to avoid interference thereof with the operation of said bridgewire resistor in causing ignition of said pyrotechnic means in said hermetically sealed chamber.

17. A combination low pressure switch/initiator/gas generator device for an inflator of a hybrid inflatable air bag safety restraint system that includes a storage chamber containing stored inflation gas under high pressure, comprising, an ignition train and pressure differential switch positioned in said storage chamber, said ignition train and differential switch comprising first and second diaphragms each of which is electrically conducting, electrically non-conductive spacer means having a first side and a second side, attaching means attaching said first diaphragm and said second diaphragm in opposed and sealing relation to said first and second sides, respectively, of said spacer means thereby forming a hermetically sealed chamber with said first diaphragm and said second diaphragm being movable toward and away from each other from a spaced relationship as the pressure in said inflator storage chamber increases and decreases relatively to the pressure in said hermetically sealed chamber, pyrotechnic means contained in said hermetically sealed chamber, said pyrotechnic means combusting when heated, a bridgewire resistor having a first end and a second end, said bridgewire resistor being located in said hermetically sealed chamber and having said first end electrically connected to said first diaphragm and said second end electrically connected to said second diaphragm, a pressure monitoring resistor having first and second ends with said ends positioned so as to make and break electrical contact with said first and second diaphragms as said first and second diaphragms are moved toward and away from each other from a predetermined spaced relationship, and electrical circuit means in which said bridgewire resistor and said pressure monitoring resistor are connected in parallel relation when said second end of said pressure monitoring resistor is in electrical contact with said second diaphragm, said electrical circuit means normally having a flow of electrical monitor current therein which is too low to cause sufficient heating of said bridgewire resistor to cause said pyrotechnic means in said chamber to combust, but having a capability of having produced therein a flow of electrical current at a level high enough to cause such heating of said bridgewire resistor.

* * * * *